US007058636B2

(12) United States Patent
Coldewey (10) Patent No.: US 7,058,636 B2
(45) Date of Patent: Jun. 6, 2006

(54) METHOD FOR PREFETCHING RECURSIVE DATA STRUCTURE TRAVERSALS

(76) Inventor: Dirk Coldewey, 828 Western Dr., Santa Cruz, CA (US) 95060

( * ) Notice: Subject to any disclaimer, the term of this patent is extended or adjusted under 35 U.S.C. 154(b) by 722 days.

(21) Appl. No.: 09/755,286

(22) Filed: Jan. 3, 2001

(65) Prior Publication Data

US 2005/0102294 A1 May 12, 2005

Related U.S. Application Data (60) Provisional application No. 60/174,745, filed on Jan. 3, 2000, provisional application No. 60/174,292, filed on Jan. 3, 2000.

(51) Int. Cl.
*G06F 7/00* (2006.01)
(52) U.S. Cl. .......................................... 707/100; 707/3
(58) Field of Classification Search ................ 707/1–4, 707/10, 100–102, 104.1, 200, 201, 204, 205; 717/106–109, 124–135
See application file for complete search history.

(56) References Cited

U.S. PATENT DOCUMENTS

| | | | | |
|---|---|---|---|---|
| 5,412,799 A | * | 5/1995 | Papadopoulos | 703/22 |
| 6,009,265 A | * | 12/1999 | Huang et al. | 707/3 |
| 6,266,733 B1 | * | 7/2001 | Knittel et al. | 711/5 |
| 6,634,024 B1 | * | 10/2003 | Tirumalai et al. | 717/161 |
| 6,675,374 B1 | * | 1/2004 | Pieper et al. | 717/141 |
| 6,717,576 B1 | * | 4/2004 | Duluk et al. | 345/419 |
| 6,760,902 B1 | * | 7/2004 | Ott | 717/113 |

OTHER PUBLICATIONS

Bjork, Russell C., "Lecture: Binary Trees", 1999, http://www.math-cs.gordon.edu/courses/cs122/lectures/bintrees.html.*

* cited by examiner

*Primary Examiner*—Greta Robinson
*Assistant Examiner*—Harold E. Dodds, Jr.

(57) ABSTRACT

Computer systems are typically designed with multiple levels of memory hierarchy. Prefetching has been employed to overcome the latency of fetching data or instructions from or to memory. In modern transaction processing systems, database servers, operating systems, and other commercial and engineering applications, information is frequently organized in trees, graphs, and linked lists. Lack of spatial locality results in a high probability that a miss will be incurred at each cache in the memory hierarchy. The present invention significantly increases the cache hit rates of many important data structure traversals, and thereby the potential throughput of the computer system and application in which it is employed. For data structure traversals in which the traversal path may be predetermined, a transformation is performed on the data structure that permits references to nodes that will be traversed in the future be computed sufficiently far in advance to prefetch the data into cache.

16 Claims, 5 Drawing Sheets

A prefetchable linked list representation.

*Figure 1*: Linked list representation with jump pointers (Prior Art).

*Figure 2*: A prefetchable linked list representation.

Figure 3: A tree data structure with history pointers (Prior Art).

Figure 4: A prefetchable tree representation.

Figure 5: Transforming a Tree into a Forest.

```
list_element_ptr  process_list( list_ptr list )
{
   int i, p;
   list_element_ptr s[PipeDepth];

/* prologue */
   p = list->headers;
   for ( i=0, i<p; i++ ) {
      PREFETCH( s[i] = list->head[i] );
   }

/* steady state */
   while ( p ) {
      for ( i=0; i<p; i++ ) {
         if ( process_element( s[i] ) == STOP )
            return s[i];
         s[i] = s[i]->next;
         PREFETCH( s[i] );
      }
   }
}
```

Figure 6: Example of a Pipelined Linked List traversal.

```
Traverse( forest_ptr forest )
{
   /* local variables */
   stack stacks[PipeDepth];   /* PipeDepth stacks */
   tree_ptr n;
   int i, trees_left = PipeDepth;
   struct {
     tree_ptr node;
     stack_ptr stack;
   } traversal[PipeDepth];       /* traversal state descriptor */

/* prologue */
   for ( i=0; i<PipeDepth; i++ ) {
     traversal[i].node = forest->root[i];
     traversal[i].stack = &stack[i];
     PREFETCH(forest->root[i], sizeof(forest->root[i]));
   }

/* steady state */
   while ( trees_left ) {
     for ( i=0; i<trees_left; i++ ) {
       if ( traversal[i].node->left ) {
         traversal[i].stack->push( traversal[i].node->left );
         traversal[i].node = traversal[i].node->left;
       } else {
         n = traversal[i].stack->pop();
         if ( n == NULL ) {     /* done with tree i */
           trees_left--;
           if ( i != trees_left )
             SWAP( &traversal[i], &traversal[trees_left] );
         }
         process( n );
         traversal[i].node = n->right;
       }
       PREFETCH( traversal[i].node );
     }
   }
}
```

Figure 7: Example of a Pipelined Tree Traversal.

```
Traverse( tree_ptr tree )
{
   /* local variables */
   . . .

/* level-order traversal prologue */
   PREFETCH( tree->root );
   enqueue( src_queue, tree->root );
   for ( i=0, accumulating=true; accumulating; i++ ) {
     n = dequeue(src_queue);
     if ( n == NULL )
        return;                 /* we're done */
     process(n->data);

if ( n->left != NULL ) {
        PREFETCH( n->left );
        enqueue( dst_queue, n->left );
     }
     if ( n->right != NULL ) {
        PREFETCH( n->right );
        enqueue( dst_queue, n->right );
     }
     if ( src_queue->size + dst_queue->size < PipeDepth ) {
        if ( i >= src_queue->size )
           SWAP( src_queue, dst_queue );
     } else {
        accumulating = false;
        while ( src_queue->size > 0 ) {
           traversal[trees_left].node = dequeue( src_queue );
           traversal[trees_left].stack = stack[trees_left];
           trees_left++;
        }
        while ( dst_queue->size > 0 ) {
           traversal[trees_left].node = dequeue( dst_queue );
           traversal[trees_left].stack = stack[trees_left];
           trees_left++;
        }
     }
   }

/* steady state loop */
      . . .
```

Figure 8: Example of a pipelined level-order tree traversal.

METHOD FOR PREFETCHING RECURSIVE DATA STRUCTURE TRAVERSALS

This application claims benefit of Ser. No. 60/174,745 a provisional application filed Jan. 3, 2000 and claims benefit of provisional application Ser. No. 60/174,292 filed Jan. 3, 2000.

FIELD OF THE INVENTION

This invention addresses the problem of prefetching indirect memory references commonly found in applications employing pointer-based data structures such as trees, linked lists, and graphs. More specifically, the invention relates to a method for pipelining traversals on these data structures in a way that makes it possible to employ data prefetching into high speed caches closer to the CPU from slow memory. It further specifies a means of scheduling prefetch operations on data so as to improve the throughput of the computer system by overlapping the prefetching of future memory references with the execution of previously cached data.

BACKGROUND OF THE INVENTION

Modern microprocessors employ multiple levels of memory of varying speeds to reduce the latency of references to data stored in memory. Memories physically closer to the microprocessor typically operate at speeds much closer to that of the microprocessor, but are constrained in the amount of data they can store at any given point in time. Memories further from the processor tend to consist of large dynamic random access memory (DRAM) that can accommodate a large amount of data and instructions, but introduce an undesirable latency when the instructions or data cannot be found in the primary, secondary, or tertiary caches. Prior art has addressed this memory latency problem by prefetching data and/or instructions into the one or more of the cache memories through explicit or implicit prefetch operations. The prefetch operations do not stall the processor, but allow computation on other data to overlap with the transfer of the prefetch operand from other levels of the memory hierarchy. Prefetch operations require the compiler or the programmer to predict with some degree of accuracy which memory locations will be referenced in the future. For certain mathematical constructs such as arrays and matrices, these memory locations can be computed a priori. In contrast, the memory reference patterns of the traversals of certain data structures such as linked lists, trees, and graphs are generally unpredictable because the nodes that make up the graph are frequently allocated at run time.

In modern transaction processing systems, database servers, operating systems, and other commercial and engineering applications, information is frequently organized in trees, graphs, and linked lists. Lack of spatial locality results in a high probability that a miss will be incurred at each cache in the memory hierarchy. Each cache miss causes the processor to stall while the referenced value is fetched from lower levels of the memory hierarchy. Because this is likely to be the case for a significant fraction of the nodes traversed in the data structure, processor utilization will suffer.

The inability to compute the address of the next address to be referenced makes prefetching difficult in such applications. The invention allows compilers and/or programmers to restructure data structures and traversals so that pointers are dereferenced in a pipelined manner, thereby making it possible to schedule prefetch operations in a consistent fashion.

REFERENCES CITED

Klaiber and H. M. Levy, An Architecture for Software-Controlled Data Prefetching, Proceedings of the 18th International Symposium on Computer Architecture 1991, pp. 43–53.

Luk and Mowry, Compiler-Based Prefetching for Recursive Data Structures, ASPLOS-VII Proceedings, October 1996, pp. 222–223.

DESCRIPTION OF PRIOR ART

Multi-threading and multiple context processors have been described in prior art as a means of hiding memory latency in applications. The context of a thread typically consists of the value of its registers at a given point in time. The scheduling of threads can occur dynamically or via cycle-by-cycle interleaving. Neither approach has proven practical in modern microprocessor designs. Their usefulness is bounded by the context switch time (i.e. the amount of time required to drain the execution pipelines) and the number of contexts that can be supported in hardware. The higher the miss rate of an application, the more contexts must be supported in hardware. Similarly, the longer the memory latency, the more work must be performed by other threads in order to hide memory latency. The more time that expires before a stalled thread is scheduled to execute again, the greater the likelihood that one of the other threads has caused a future operand of the stalled thread to be evacuated from the cache, thereby increasing the miss rater, and so creating a vicious cycle.

Non-blocking loads are similar to software controlled prefetch operations, in that the programmer or compiler attempts to move the register load operation sufficiently far in advance of the first utilization of said register so as to hide a potential cache miss. Non-blocking loads bind a memory operand to a register early in the instruction stream. Early binding has the drawback that it is difficult to maintain program correctness in pointer based codes because loads cannot be moved ahead of a store unless it is certain that they are to different memory locations. Memory disambiguation is a difficult problem for compilers to solve, especially in pointer-based codes.

In order to effectively prefetch linked lists, prior art has employed prefetch pointers at each node of the linked list. Each prefetch pointer is assigned the address of a list element sufficiently far down the traversal path of the linked list so that a prefetch request may be issued far enough in advance for the element to arrive in cache before the element is actually reached in the course of the ordinary traversal. The storage overhead for prefetch pointers is O(N). Furthermore, the data structure cannot be subject to frequent change, since the cost of maintaining the prefetch pointers can be prohibitive. Another approach advocated by prior art is embedding the data structure in an array. This removes the O(N) storage overhead incurred with prefetch pointers, but eliminates the benefits of employing a pointer-based data structure as well.

Figure 1:
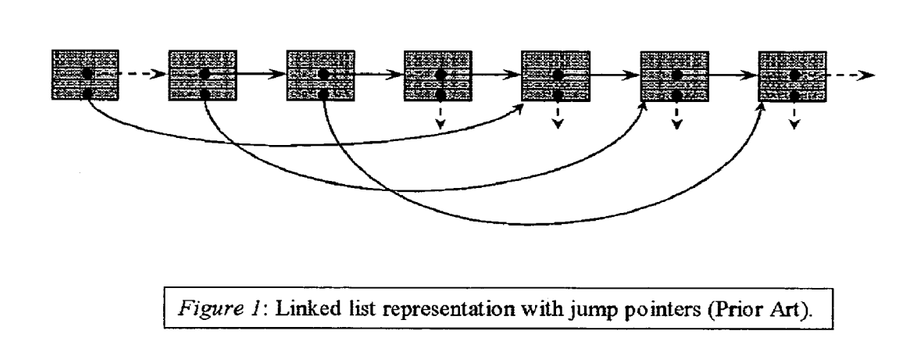
FIG. 1 illustrates a linked list according to prior art, with O(N) storage overhead, where N corresponds to the number of elements in the list.
Figure 2:
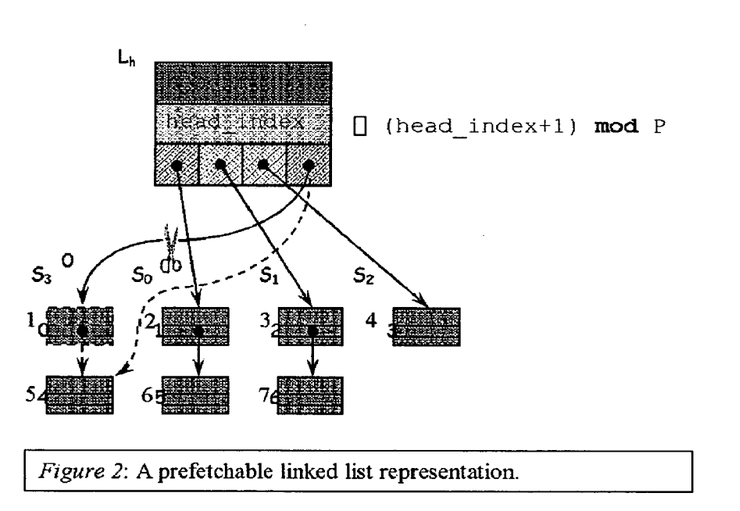
FIG. 2 illustrates a linked list implementation that preserves O(1) push and pop, enqueue and dequeue operations, yet is prefetchable with only O(1) storage overhead. The list in this example is constructed of four sublists, $S_0$, $S_1$, $S_2$, and $S_3$. List element 1 can be deleted by assigning sublist header $S_3$ to the element pointed to the child pointer of element 1, i.e. element 5. The index of the head of the list, head_index is then incremented modulo P, where P is the number of sublists. Similarly, deletion from the tail decrements the index of the variable indicating the tail element, while the parent of the linked list element is assigned a child pointer value indicating no further children.
Figure 3:
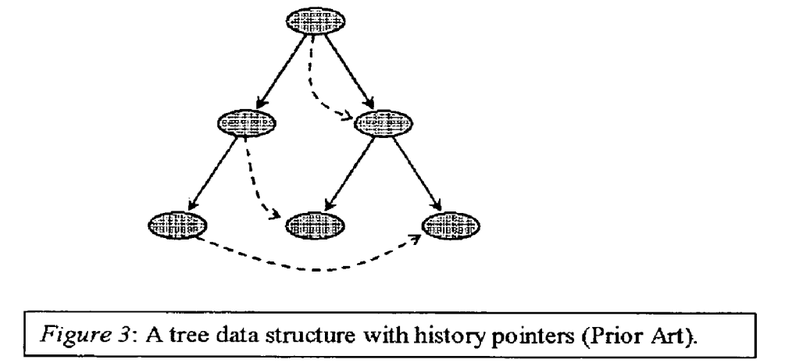
FIG. 3 illustrates an implementation of a tree with history pointers with O(N) storage overhead. The history list is constructed during a separate traversal of the data structure.
Figure 4:
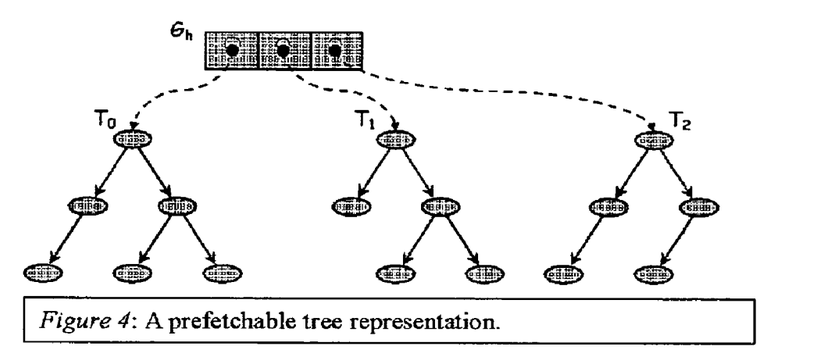
FIG. 4 illustrates an implementation of a tree data structure that is prefetchable. Multiple subtrees, in this example, $T_0$, $T_1$, $T_2$, are represented as a group by means of the data structure $G_h$. In this example, the group is structured as an array, but any representation of the group is applicable.

Similar to a linked list traversals, traversal of a tree data structure would have to prefetch more than a single node ahead in the traversal path in order to hide any significant memory latency. In codes where both the data structure and the traversal path through the data structure remain static over the course of many traversals, it may be possible to maintain a traversal history pointer at each node, as illustrated in FIG. 3. Maintaining the adjunct history pointer adds significant storage space overhead for each of the pointers. The approach can also incur significant runtime overhead to maintain the history pointers whenever the data structure is updated because the data structure must be traversed in its entirety in order to ensure that the correct nodes are prefetched.

SUMMARY OF THE INVENTION

The present invention significantly increases the cache hit rates of many important data structure traversals, and thereby the potential throughput of the computer system and application in which it is employed. For data structure traversals in which the traversal path may be predetermined, a transformation is performed on the data structure that permits references to nodes that will be traversed in the future be computed sufficiently far in advance to prefetch the data into cache.

For data structure traversals in which the traversal path may be predetermined, the underlying data structure is given an alternative representation of multiple substructures. Thus a linked list is implemented as a group of linked lists in the following manner: The first element of the linked list is placed at some predetermined location in the data structure representing the group. The second element is placed at another location in the group data structure. A function is determined that sequentially yields the address of the location in the first location of each linked list in the group.[1] A prefetch request is then issued for the first elements of each of the N lists, where N is sufficiently large so that a prefetch operation can hide the latency of cache miss. As each list element in each list is processed, a prefetch request may be issued for the next element in the list A separate group of position pointers maintains the position of the traversal of each of the N lists, and is updated as each node is processed. The next node to be traversed is the node in the next list (rather than the next element of a given list). Each node indicated by the position pointers is therefore visited in the order indicated by the aforementioned function. If the function is given by $f(x)=(x+1)$ modulo N, and the group of position pointers is represented by an array P, then the position pointers indicated are traversed in the order $P[0]$, $P[1], P[2], \ldots, P[N], P[0], P[1], \ldots$ As the list element pointed to by each position pointer is traversed, each position pointer is updated to point to the next element of the list.

[1] The group of lists can be represented by an array, and the function merely increments the array index by one, i.e. $f(x)=(x+1)$ modulo N.

The same method can be applied to general pointer-based data structures. Tree data structures are frequently used to represent sets, for instance. The invention represents a tree as a group of trees, henceforth referred to as a forest in this application. Instead of traversing the nodes of a single tree, the traversal of N trees are conducted in a pipelined fashion. As a node in a given tree is processed, a prefetch request is issued for the appropriate child that is to be visited next in that subtree. Alternatively, it is possible to issue a prefetch request for the address indicated in the updated position pointer at position $P[(I+D)$ modulo $F]$, where I is the current position, D is the number of trees across which a prefetch must occur in order to hide latency introduced by a cache miss, and F is the number of trees in the forest.

DETAILED DESCRIPTION

Prefetching pointer-based data structures is much more difficult that prefetching data structures with regular access patterns. In order to prefetch array based data structures, Klaiber and Levy proposed using software pipelining—a method of issuing a prefetch request during one loop iteration for a memory operand that would be used in a future iteration. For example, during loop iteration j in which an array X[j] is processed, a prefetch request is issued for the operand X[j+d], where d is the number of loop iterations required to hide the memory latency of a cache miss. The problem with this method of scheduling prefetch requests, prior to the introduction of this invention, is that it could not be applied to pointer-based data structures. The invention partitions pointer based data structures into multiple substructures, and then schedules prefetch requests by pipelining accesses across multiple substructures in a manner similar to that described by Klaiber and Levy. The application of the invention is illustrated on two important data structures below, linked lists and trees.

The invention consists of the following method. Step 1 is to create a parallel data structure consisting of N partitions. Step 1 can be performed by means of transforming an existing data structure into a parallel data structure, by generating the implementation via a class library or container classes in an object oriented system, or by a compiler. Step 2 is to pipeline the traversal across the N partitions of the data structure. Step 3 is to determine the prefetch distance required in order to traverse the data structure of step 1 using the pipelined traversal of step 2. The prefetch distance may be determined experimentally by the programmer, computed using prior art, or by the compiler. Step 3 is to insert prefetch instructions into the traversal loop body (the steady state loop). The steady state loop may be optionally preceded by a prologue which performs no data structure traversal but which does generate prefetch instructions. The steady state loop may be followed by an epilogue in which no prefetch instructions are performed, but in which traversal of the data structure continues and possibly completes.

These methods can be illustrated by means of a linked list traversal. Instead of maintaining a jump pointer as described by Luk and Mowry, the linked list is partitioned into, or constructed as, p sublists. The list header is augmented to save the index of the last sublist to which an element was added, as well as the index of the list that contains the current header. An additional state vector s is associated with the list to maintain the current pointer into each sublist. If the order in which the nodes are appended to the list is $l_0, l_1, \ldots, l_n$, then $l_i$ is added to the end of list i modulo p. If the head of the list resides in sublist h and is to be deleted, then the value of the list head index, H, is updated to h+1 modulo p.

A node is added to the head of the list by updating the list head index to h−1 modulo d and inserting the node at the head of that list. Assuming a corresponding array of tail pointers, elements can be inserted and deleted from the tail of the list in a similar fashion. This arrangement makes it possible to maintain much of the flexibility of linked lists while preserving the traversal order, which may be an important consideration for managing event queues or other FIFO structures of sufficient size to warrant prefetching. If traversal order is not a factor, or insertion and deletion from an arbitrary position in the list must be supported, then the process can be modified to simply contain d pointers into the list approximately the same distance apart.

Figure 6:
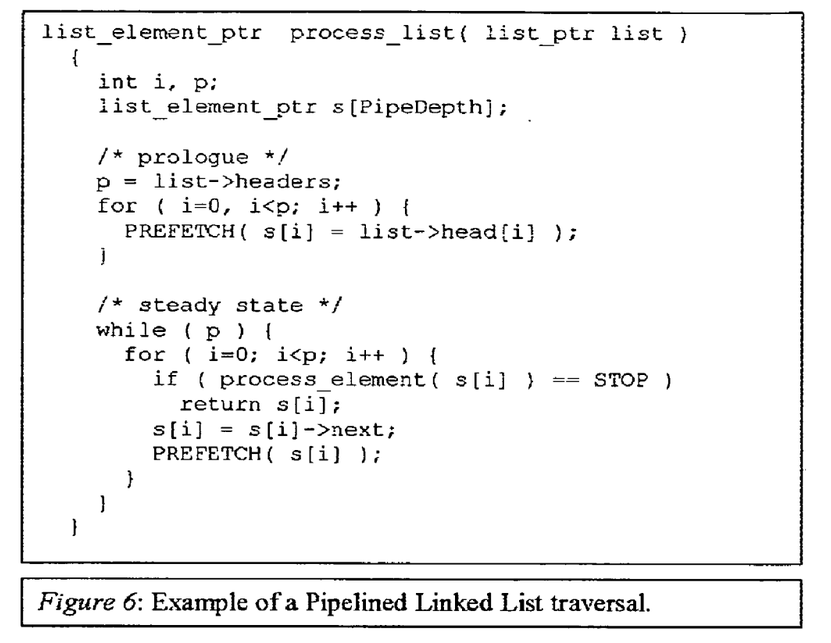
FIG. 6 provides an example of a pipelined linked list traversal with prefetching. The array elements s[i] maintain the traversal pointers for each of the sublists $S_i$ of FIG. 2. For this example, it is assumed that the actual work on each element is performed by the subroutine process_element( ), which is assumed to return a value corresponding to the token STOP when a stopping point has been reached, such as the end of the list or an element that is being searched for, etc. The variable p indicates the depth of the software pipeline, i.e. the number of cycles required to hide the latency of a memory reference. The token PREFETCH is used to indicate a prefetch request for the address stored in the subsequent variable.

The code fragment in FIG. 6 illustrates the software pipelined traversal of a set of sublists. If the traversal is completed before the end of the list, then any extra prefetch requests represent pure overhead and unnecessary additional memory traffic. While the invention applies to both uniprocessors and multiprocessors, even in a uniprocessor, the CPU shares the memory bus with I/O controllers. Since I am primarily concerned with aggregate throughput, for a significantly long list the cost of these few cases can be quickly amortized.

The method works well if the amount of work required to traverse from any given node in the data structure to its successor is small. Preorder traversal of a tree, in contrast, requires work at each node to determine the next node. The work arises from maintaining the stack and determining whether to follow the left or the right child pointer. Our approach requires less memory and is more flexible with respect to insertions and deletions than Luk and Mowry's method. The number of sublists may be larger than the pipeline depth for any one traversal loop. Thus if the number of sublists is selected to be sufficiently large to accommodate the largest pipeline depth of any traversal loop that the application is apt to encounter, then the prefetch distance can still be adjusted to an optimal value.

The method employed for hiding latency in linked list traversals can also be applied to trees. There are two operations commonly performed on static trees: performing some operation on the entire tree and searching a tree for particular nodes. Operations performed on an entire tree, are addressed in this section. Miss rates for the traversal of an entire tree will be high, since there is very little reuse among cached nodes during the traversal process. Finding a node in tree-structured indices is common to database applications, and is addressed in a separate, concurrently submitted, patent application.

An alternative approach uses a parallel traversal to accomplish the same goal by maintaining the state of the parallel traversals. Software pipelining is performed across the parallel traversals, rather than within a single traversal. In order to facilitate the parallelism, the tree is partitioned into a forest of d trees, where d is the software pipeline depth required to hide memory latency. This approach trades off runtime overhead for storage. History pointers require O(N) extra storage, while the software pipelined approach incurs O(d) extra storage for the state vector and requires O(d log N) storage for maintenance of multiple stacks. The runtime overhead of the software pipelined approach results from maintaining the state of multiple parallel traversals.

Figure 7:
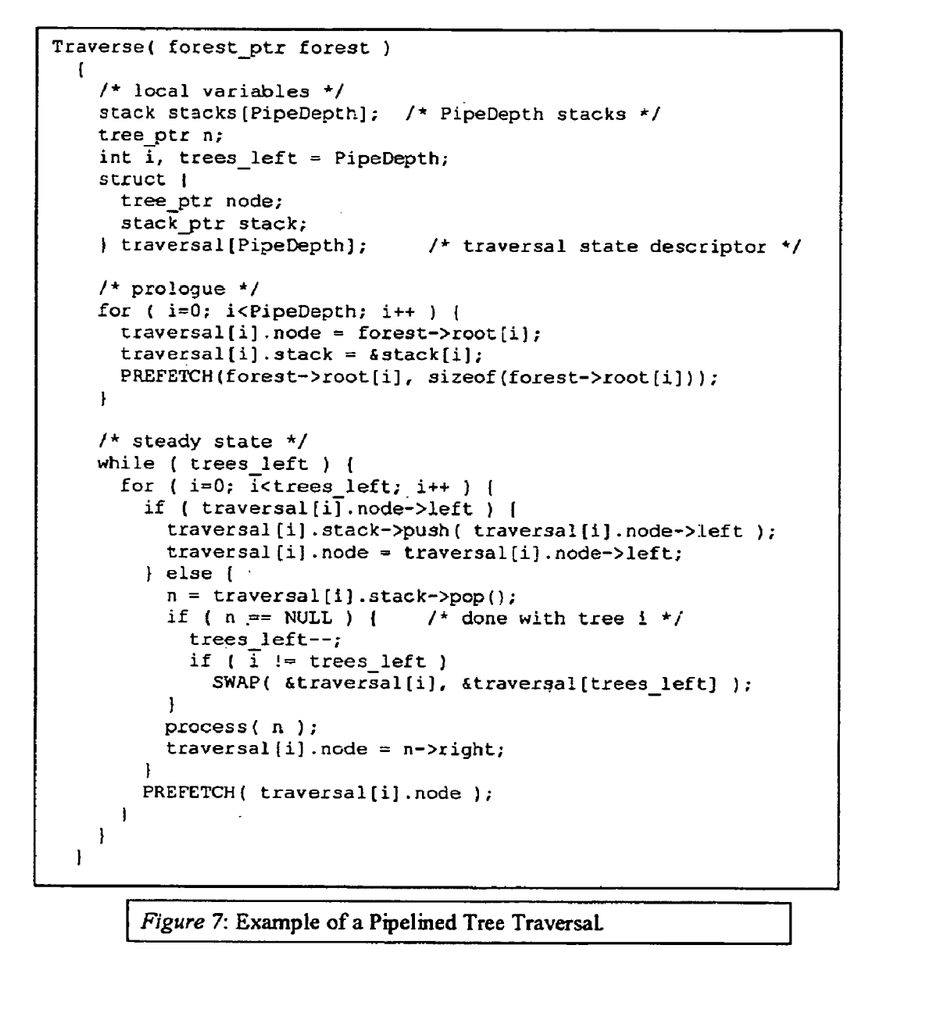
FIG. 7 is a code fragment that provides an example of a pipelined traversal of a set of trees.

Software pipelined traversals of a forest of binary trees is illustrated in FIG. 7. The data structure in this example does not contain parent pointers. Each tree in the forest is traversed in an in-order fashion, and software pipelining occurs across the traversals of each tree in the forest in a round-robin fashion. Software pipelining advances the traversal of each tree in the forest by one node before switching to the next tree, performing a prefetch for the left or right child when the current node is advanced.

The same approach can be applied to a recursive version. I selected an iterative version to illustrate this approach because it makes the management of the stack explicit. The prologue code is used to initialize the state vector s and prefetch the root nodes of each of the trees in the forest. At some point during the traversal process, one of the traversals will necessarily complete before the others, causing the variable representing the number of active traversals, p, to be decremented. In order to maintain the state of active traversals at consecutive locations of s, the state location of a completed traversal is always replaced by the state of the last active traversal, located at the position indicated by the decremented value of p.

As a result of prefetching across parallel traversals, there is no epilogue code. As the number of parallel traversals that are in progress decreases, so does the effective depth of the software pipeline, and hence the available prefetch distance. In a balanced binary tree, this is not much of a problem because all traversal requests will complete within a short time of each other. One way to guard against the problem is to increase the number of trees in the forest, with the hope that a sufficient amount of parallelism will be available among them for a longer duration. Increasing the depth of the software pipeline brings with it potential interference from the additional stack space and state representations that the minor decrease in the depth of the average tree cannot compensate for.

When the traversal order is a requirement, the data structure can follow a similar approach to that employed for linked lists. For a pre-order traversal, for instance, the tree is built as a forest of trees, where node $n_i$ is inserted into tree $T_{i\ modulo\ p}$, where p is the total number of trees in the forest. A post-order traversal follows an analagous construction methodology.

Figure 5:
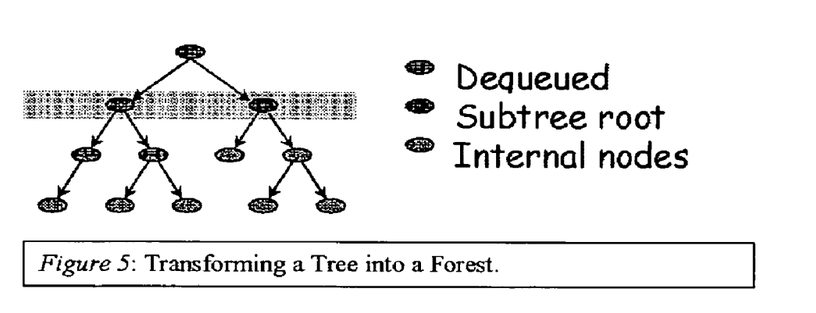
FIG. 5 illustrates how a tree traversal is modified into a forest traversal.
Figure 8:
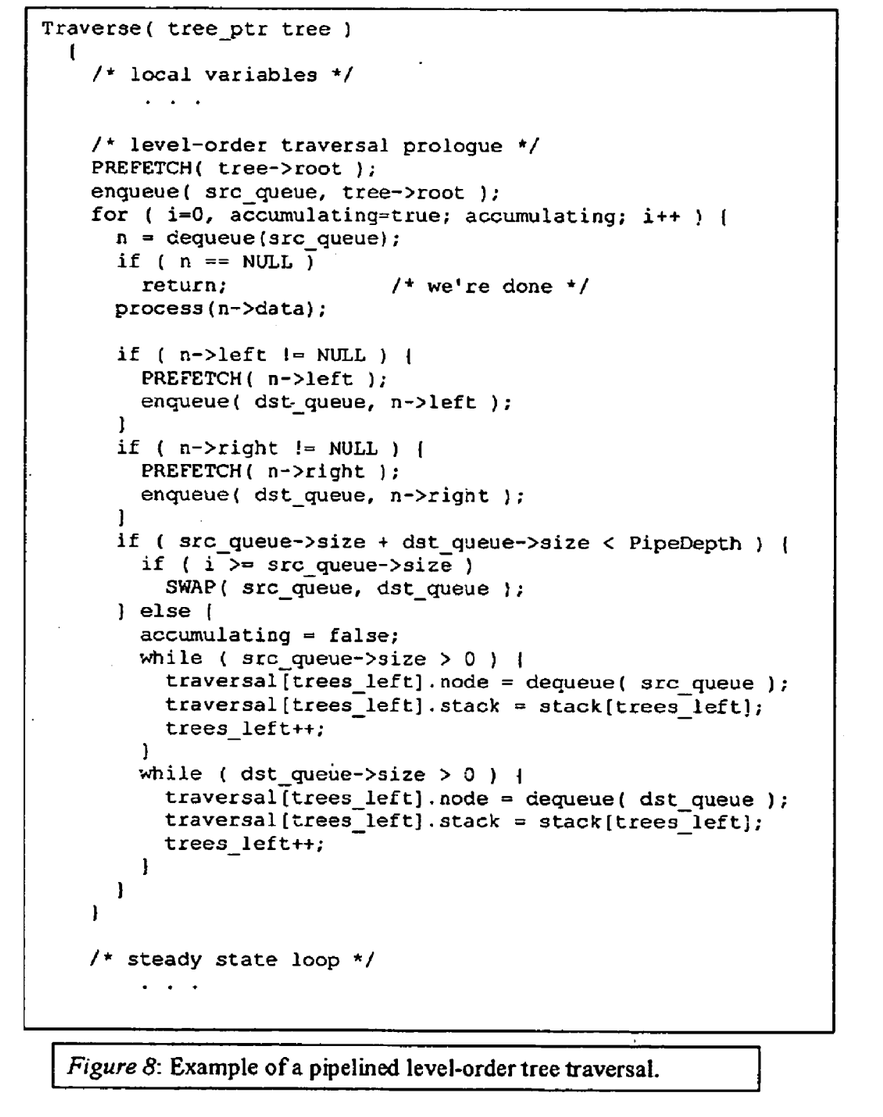
FIG. 8 is a code fragment that provides an example of a pipelined level order traversal, which is used to generate a list of trees across which a pipelined traversal can subsequently be performed.

It is not always acceptable to maintain a forest instead of a single tree. In those cases where the traversal order is not important, as when the tree is used to represent a set, the tree can be partitioned by means of a level-order traversal. The ⌈log d⌉−1 nodes closest to the root can be traversed and processed in a level-order fashion during the prologue. The children of level ⌈log d⌉−1 are stored in the state vector s, and the search commences on this forest of subtrees as before. The prologue that performs this task is illustrated in FIG. 8. With each iteration, src_queue contains the nodes of the current level, and dst_queue contains the nodes of the next level. Once the current level has been processed, the source and destination queues swap roles; the process is repeated until the appropriate number of levels have been traversed. FIG. 5 illustrates the state of the queues once the root node and its left child have been processed. Prefetch requests have been issued for the right child of the root node and the two children of the left child of the root node, which currently occupy the queue. The elements in the queue are the candidates for root nodes of the subtrees across which pipelined tree traversals can be performed.

Level-order traversal is not generally desirable because of its dynamic storage requirements: the queue grows by a factor of k in a k-ary tree at each level, eventually reaching a size of n/k. Since the pipelne depth, represented by PipeDepth in our example, tends to be small, only a small number of nodes need to be enqueued before a sufficient number of subtrees have been identified to allow effective software pipelining.

CONCLUSION

Having described and illustrated the principles of the invention in a preferred embodiment thereof, it should be apparent that the invention can be modified in arrangement and detail without departing from such principles. I claim all modifications and variations coming within the spirit and scope of the invention.

I claim:

1. A method for creating a linked list data structure to which prefetching can be applied in order to minimize the number cache misses endured during traversal of a steady state loop, said method comprising the steps of:
   creating a parallel data structure consisting of a plurality of partitions (N) consisting of a plurality of sublists (P), associating a state vector (S) with the data structure to maintain the state of the traversal of each sublist, and maintaining the state of the last sublist to which an element is added in a variable (H), whereby additions are made to the the head of the list by decreasing the list head index to H−1 modulo P and adding new nodes to the head of the list indexed by the thus updated value of the head index,
   pipelining the traversal across the N partitions of the data structure;
   determining the prefetch distance required in order to traverse said data structure using the aforementioned pipelined traversal,
   inserting prefetch instructions into the traversal loop body.

2. The method for creating a data structure according to claim 1 wherein the data structure is provided as part of a library.

3. The method for creating a data structure according to claim 1 wherein a data structure defined by an application is transformed by a compiler, said compiler performing the necessary steps to modify corresponding traversal code to perform software pipelined prefetching.

4. The method of creating a data structure according to claim 1 wherein the data structure is generated by a set of macros.

5. The method of creating a data structure according to claim 1 wherein the method of creating such a data structure is supplied as part of a class library in an object oriented system.

6. The method of creating a data structure according to claim 1 wherein the steady state loop is preceded by a prologue which performs no data structure traversal, but which does generate prefetch instructions.

7. The method of creating a data structure according to claim 1 wherein the steady state loop is followed by an epilogue in which no prefetch instructions are performed, but in which traversal of the data structure continues and possibly completes.

8. The method of constructing a linked list according to claim 1 wherein additions to the end of the list are added to the end of the sublist indexed by 1 modulo P and the list header index H updated to H+1 modulo P.

9. The method of constructing a linked list according to claim 1 wherein
   a variable (T) holds the index of the last sublist to have an element inserted,
   an array containing P pointers, said pointers linking to the tail of each sublist,
   insertion at the tail of the list is performed by the method consisting of
      updating the list tail index (T) to T+1 modulo P and adding a node to the sublist indicated by the new value of T,
   and whereby deletion from the tail of the sublist is performed by the method consisting of
      updating the list tail index (T) to T−1 modulo P and deleting the node from the tail of the sublist indicated by the new value of T.

10. The method of traversing the linked list constructed according to claim 1 whereby the linked list is traversed by the method comprising the steps of
    prefetching the head of each sublist;
    initializing a vector (S) with the head of each sublist;
    traversing the list in a software pipelined manner by iterating over S and processing each node held in S, performing the requested work on each node held in S, updating each element of S to hold the next element in the corresponding sublist,
    and issuing a prefetch for the next node in each sublist.

11. The method of traversing a tree according to the method of claim 1 wherein a tree is constructed as a forest of trees.

12. The method of constructing a pre-order traversal tree according to the method of claim 1 comprising
    a plurality of trees (P);
    an array in which to store a pointer to the root node of each tree;
    a variable (T) holding the value of the last tree into which a node was inserted;
    the method of adding a node to the forest by assigning the value T+1 modulo P to the variable T and using a normal insertion into the tree indexed by the value of T thus updated;
    the method of traversing the forest in pre-order fashion.

13. A method of traversing a single tree by creating a forest of subtrees by the method comprising the steps of:
    initiating a level-order traversal starting at the root,
    maintaining an array of pointers to nodes in the tree in the course of the level-order traversal, discontinuing the level-order traversal when a number of subtrees sufficient for effective software pipelined traversal has been achieved, the aforementioned array of pointers thereby containing the pointers to the roots of the trees of a forest to which software pipelined traversal is applied, then proceeding with a traversal, wherein a tree is constructed as a forest of trees, and subtrees pointed to by the aforementioned array of subtrees constitute the forest across which software pipelined traversals are performed.

14. The method of traversing a single tree according to claim 13 wherein the children of each node encountered in the course of the level order traversal are prefetched.

15. The method of deconstructing a tree into a forest according to claim 13 whereby a queue is used to hold the nodes of the current level of an in-order traversal of the tree, said nodes being added to said queue as they are encountered in the course of the traversal of each level, a second queue is used to hold pointers to the children of the nodes at the current level, said queues swap roles as the traversal transitions from one level to the next, and the forest is constructed from the subtrees rooted at the nodes pointed to by the contents of the aforementioned two queues.

16. The method of traversing a single tree according to claim 15 wherein the children of each node encountered in the course of the level order traversal are prefetched.

* * * * *